United States Patent
Ho

(10) Patent No.: US 10,529,232 B2
(45) Date of Patent: Jan. 7, 2020

(54) DRIVING SERVICE SYSTEM AND PROVIDER-SIDE MOBILE DEVICE AND SERVER THEREOF

(71) Applicant: Kuan-Hui Ho, New Taipei (TW)

(72) Inventor: Kuan-Hui Ho, New Taipei (TW)

( * ) Notice: Subject to any disclaimer, the term of this patent is extended or adjusted under 35 U.S.C. 154(b) by 0 days.

(21) Appl. No.: 16/058,246

(22) Filed: Aug. 8, 2018

(65) Prior Publication Data

US 2019/0051175 A1 Feb. 14, 2019

(30) Foreign Application Priority Data

Aug. 9, 2017 (CN) .......................... 2017 1 0675900

(51) Int. Cl.
*G08G 1/13* (2006.01)
*G08G 1/137* (2006.01)
*H04W 4/029* (2018.01)

(52) U.S. Cl.
CPC ............... *G08G 1/13* (2013.01); *G08G 1/137* (2013.01); *H04W 4/029* (2018.02)

(58) Field of Classification Search
CPC ...... G08G 1/13; G08G 1/137; G01C 21/3694; H04W 4/029
See application file for complete search history.

(56) References Cited

U.S. PATENT DOCUMENTS

| 10,304,027 | B1 * | 5/2019 | Haque | G06Q 40/08 |
| 2014/0114565 | A1 * | 4/2014 | Aziz | G06Q 10/063 701/425 |
| 2017/0086051 | A1 * | 3/2017 | Truong | H04W 4/029 |
| 2018/0268711 | A1 * | 9/2018 | Lubeck | H04W 4/029 |

\* cited by examiner

*Primary Examiner* — Minjung Kim
(74) *Attorney, Agent, or Firm* — Muncy, Geissler, Olds & Lowe, P.C.

(57) ABSTRACT

A driving service system, a provider-side mobile device and a server are disclosed. The driving service system includes the server and the provider-side mobile device. The provider-side mobile device is communicational connected with the server. When a driving mission is assigned to an owner of the provider-side mobile device, the owner operates an input unit of the provider-side mobile device to input identity information of the owner and to select a driving route corresponding to the driving mission. The provider-side mobile device provides position information when moving on the driving route. The server obtains a position of the provider-side mobile device on first map information and the identity information of the owner according to the position information.

18 Claims, 6 Drawing Sheets

DRIVING SERVICE SYSTEM AND PROVIDER-SIDE MOBILE DEVICE AND SERVER THEREOF

CROSS REFERENCE TO RELATED APPLICATIONS

This Non-provisional application claims priority under 35 U.S.C. § 119(a) on Patent Application No(s). 201710675900.X filed in People's Republic of China on Aug. 9, 2017, the entire contents of which are hereby incorporated by reference.

BACKGROUND

Technology Field

The present disclosure relates to a driving service system, and a provider-side mobile device and a server of the driving service system.

Description of Related Art

The school buses are the major transportation vehicles for many students. In general, the bus driver will drive the school bus on a fixed and predetermined route, so the students can take the same school bus driven by the same bus driver at a preset location or bus station every day. However, when a driver or a school bus may occasionally be changed, it is hard to automatically and immediately realize the schedules of the drivers and the school buses on duty and to know which driver is responsible for driving on a particular route. This will not only result in chaos in scheduling, but the school may also not be able to control the driving status of the school bus immediately. Moreover, the students may also be troubled by different drivers or school buses. Therefore, in the dispatch of the drivers or school buses, the current practice has little flexibility.

In addition, the bus company or school may realize the moving direction and position of the vehicle by the GPS installed thereon. However, this approach can only passively receive the position of the vehicle. If the driver or the bus is substituted temporarily, the school may not acknowledge the identity of the driver and the driving situation. This will cause the supervision or management problems.

SUMMARY

An objective of this disclosure is to provide a driving service system and a provider-side mobile device and a server thereof that can dynamically assign the driver and the corresponding driving route, and instantly know the driver for driving on a certain driving route, thereby improving the flexibility on dispatch.

In order to achieve the above objective, the present disclosure provides a driving service system, which includes a server and a provider-side mobile device communicational connected with the server. The provider-side mobile device includes an input unit. When a driving mission is assigned to a provider-side owner of the provider-side mobile device, the provider-side owner operates the input unit of the provider-side mobile device to input identity information of the provider-side owner and to select a driving route corresponding to the driving mission. The provider-side mobile device provides position information when moving on the driving route. The server obtains a position of the provider-side mobile device on first map information and the identity information of the provider-side owner according to the position information.

To achieve the above objective, the present disclosure also provides a provider-side mobile device of a driving service system. The driving service system further includes a server communicational connected with the provider-side mobile device, and the provider-side mobile device includes an input unit. When a driving mission is assigned to a provider-side owner of the provider-side mobile device, the provider-side owner operates the input unit of the provider-side mobile device to input identity information of the provider-side owner and to select a driving route corresponding to the driving mission. The provider-side mobile device provides position information when moving on the driving route. The server obtains a position of the provider-side mobile device on first map information and the identity information of the provider-side owner according to the position information.

To achieve the above objective, the present disclosure further provides a server of a driving service system. The driving service system further includes a provider-side mobile device communicational connected with the server. The provider-side mobile device includes an input unit. When a driving mission is assigned to a provider-side owner of the provider-side mobile device, the provider-side owner operates the input unit of the provider-side mobile device to input identity information of the provider-side owner and to select a driving route corresponding to the driving mission. The provider-side mobile device provides position information when moving on the driving route. The server obtains a position of the provider-side mobile device on first map information and the identity information of the provider-side owner according to the position information.

In one embodiment, the driving service system further includes a passenger-side mobile device or a monitor-side device communicational connected with the server. The provider-side mobile device, the passenger-side mobile device, or the monitor-side device includes a display unit. The display unit of the provider-side mobile device, the passenger-side mobile device, or the monitor-side device shows the position of the provider-side mobile device on second map information and the identity information of the provider-side owner according to the position information.

In one embodiment, the driving service system further includes a passenger-side mobile device and a monitor-side device communicational connected with the server. When the server receives information indicating that the passenger-side mobile device and the provider-side mobile device are moving together on the driving route, the server sends information of a passenger-side owner of the passenger-side mobile device to the monitor-side device.

In one embodiment, the driving service system further includes a monitor-side device communicational connected with the server. When the server receives passenger identity information from the provider-side mobile device, the server sends the passenger identity information to the monitor-side device.

In one embodiment, the driving service system further includes a monitor-side device communicational connected with the server. When the provider-side mobile device does not arrive a designated destination within a predetermined time, the provider-side mobile device sends a delay event to the server, and the server sends a delay notification to the monitor-side device according to the delay event.

In one embodiment, the driving service system further includes a monitor-side device communicational connected with the server. When an event is happened as the provider-side mobile device is moving on the driving route, the provider-side mobile device sends a report event to the server, and the server sends a report notification to the monitor-side device according to the report event.

As mentioned above, in the driving service system of this disclosure, when a driving mission is assigned to a provider-side owner of the provider-side mobile device, the provider-side owner operates the input unit of the provider-side mobile device to input identity information of the provider-side owner and to select a driving route corresponding to the driving mission, the provider-side mobile device provides position information when moving on the driving route, and the server obtains a position of the provider-side mobile device on first map information and the identity information of the provider-side owner according to the position information. Accordingly, the driving service system of this disclosure is to track the user instead of tracking the vehicle. Thus, the system can dynamically assign the provider (driver) and the driving route, and instantly know the driver for driving on a certain driving route and the driving situation, thereby improving the flexibility on dispatch.

In some embodiments, the manager and maintenance staff of the server, the owner of the passenger-side mobile device, and the owner of the monitor-side device can instantly know the position and situation of the provider or passenger, thereby increasing the convenience in management.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1:
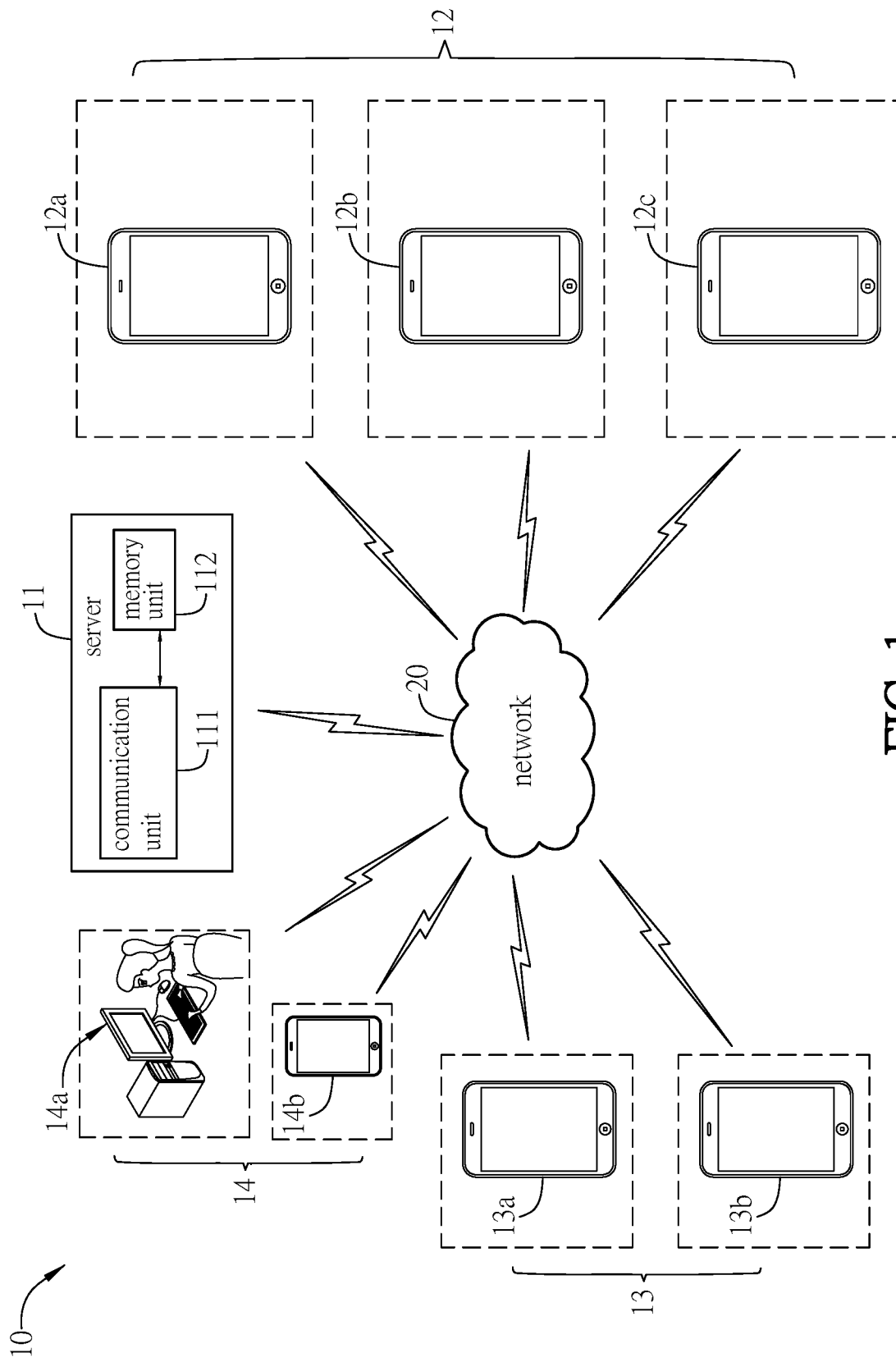
FIG. 1 is a schematic diagram showing a driving service system according to an embodiment of this disclosure.

FIG. 1 is a schematic diagram showing a driving service system 10 according to an embodiment of this disclosure. As shown in FIG. 1, the driving service system 10 includes a server 11 and at least one provider-side mobile device 12. In addition, the driving service system 10 may further include at least one passenger-side mobile device 13 and at least one monitor-side device 14.

As shown in FIG. 1, the driving service system 10 includes three provider-side mobile devices 12a, 12b and 12c, two passenger-side mobile devices 13a and 13b, and two monitor-side devices 14a and 14b. The configuration of this embodiment is for an example, and this disclosure is not limited thereto. In other words, the amounts of the provider-side mobile devices 12, the passenger-side mobile devices 13, and the monitor-side devices 14 can be the same or different, and the types and models of these devices can be the same or different. In this embodiment, each provider-side mobile device 12 or each passenger-side mobile device 13 can be, for example but not limited to, a smart phone, a tablet computer, a notebook computer (e.g. UMPC), a wearable device, or any of other electronic devices. Each monitor-side device 14 can be, for example but not limited to, a smart phone, a tablet computer, a notebook computer (e.g. UMPC), a desktop computer, a wearable device, or any of other electronic devices. Referring to FIG. 1, the provider-side mobile devices 12a, 12b and 12c and the passenger-side mobile devices 13a and 13b are smart phones, and the monitor-side devices 14a and 14b are desktop computers. This disclosure is not limited thereto. In other embodiments, the amounts of these devices can be different, and these devices can be different types or models of electronic devices.

For example, the driving service system 10 is applied to a school bus for driving the students to school or home. This disclosure is not limited thereto. In another embodiment, the driving service system 10 can be applied to the rehabus, taxis, taxi-like cars (such as Uber), tour companies, or other transportations.

The server 11 can be managed or maintained by the system provider. The provider-side mobile device 12 (12a, 12b, 12c) can be the personal mobile device of the provider-side owner (e.g. the school bus driver). The passenger-side mobile device 13 (13a, 13b) can be the personal mobile device of the passenger (e.g. the students). The monitor-side device 14 (14a, 14b) can be the electronic device of the monitor-side owner (e.g. the school staff, teacher, student's parents, or staff of bus company) for managing or monitoring the bus driver, school bus, or students.

All of the provider-side mobile device 12, the passenger-side mobile device 13 and the monitor-side device 14 have a communication function and are communicational connected with the server 11 through a network 20. In other words, the server 11, the provider-side mobile device 12, the passenger-side mobile device 13 and the monitor-side device 14 can transmit data to one another or receive data from one another by any communication technology.

The server 11 includes a communication unit 111, which can be communicational connected with the provider-side mobile device 12, the passenger-side mobile device 13 or the monitor-side device 14. The communication unit 111 can transmit data to the provider-side mobile device 12, the passenger-side mobile device 13 or the monitor-side device 14, or receive data from the provider-side mobile device 12, the passenger-side mobile device 13 or the monitor-side device 14. The data transmission method between the server 11 and any of the provider-side mobile device 12, the passenger-side mobile device 13 and the monitor-side device 14 can be various depending on the hardware architecture. In specific, these devices can be communicational connected via, for example but not limited to, wired or wireless technology (e.g. 3G Wi-Fi, or 4G LTE). In addition, the server 11 can further include a memory unit 112, which is configured for accessing application programs or the identities (e.g. names, genders, ages, addresses, or codes) of the provider-side owners (e.g. drivers). Moreover, the memory unit 112 can be further configured for accessing the identities of the passenger-side owners (e.g. students) or the monitor-side owners (e.g. school staffs, teachers, parents, or bus company staffs). The memory unit 112 can be any non-transitory storage media such as, for example but are not limited to, a flash memory, an optical disk, or a magnetic disk. In different embodiments, the server 11 may also include, for example, a display unit, an input unit, a processing unit, other components, or peripheral devices.

Figure 2:
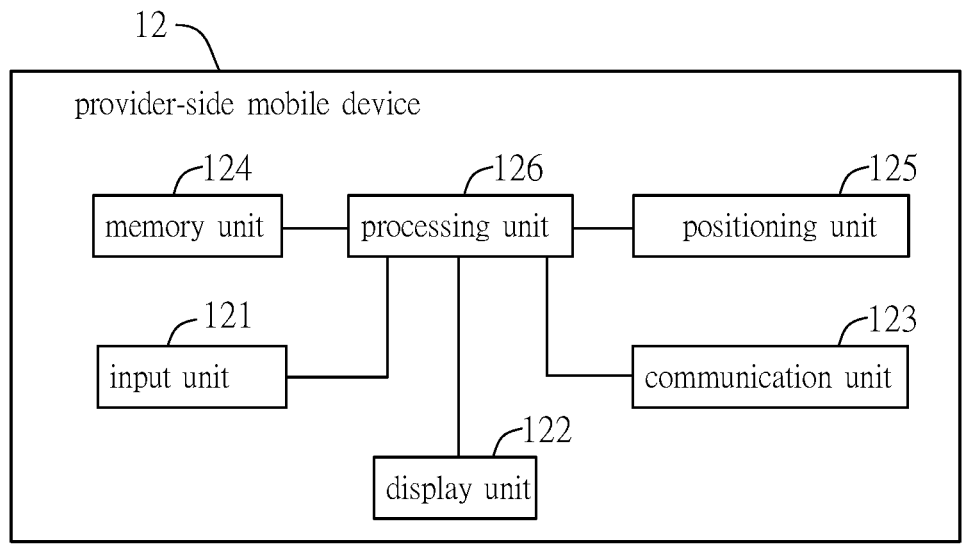
FIG. 2 is a block diagram of the provider-side mobile device according to an embodiment of this disclosure.

In this embodiment, the provider-side mobile device 12 is a smart phone. FIG. 2 is a block diagram of the provider-side mobile device 12 according to an embodiment of this disclosure. As shown in FIG. 2, the provider-side mobile device 12 includes an input unit 121. In addition, the provider-side mobile device 12 further includes a display unit 122, a communication unit 123, a memory unit 124, a positioning unit 125, and a processing unit 126. The input unit 121, the display unit 122, the communication unit 123, the memory unit 124, and the positioning unit 125 are individually coupled with the processing unit 126.

In the smart phone, the input unit 121 can be a touch input device, which can be assembled with the display unit 122 to form a touch display panel. The display unit 122 can display an image. The provider-side owner (e.g. driver) can operate the input unit 121 to input some information (e.g. personal identity information). The communication unit 123 is communicational connected with the server 11, so the identity information or other information (e.g. the position information of the provider-side mobile device 12) can be transmitted from the smart phone to the server 11. The memory unit 124 can store the necessary data or application programs (e.g. Apps). The positioning unit 125 is configured to receive the positioning signal, which is provided to the provider-side mobile device 12 to calculate the position information. Then, the position information can be transmitted to the server 11 through the communication unit 123 and the communication unit 111. In this embodiment, the positioning unit 125 can be, for example but not limited to, GPS, GLONASS (Global Navigation Satellite System), BDS (BeiDou Navigation Satellite System), or WLAN (Wireless local area network). This disclosure is not limited.

Similarly, each of the passenger-side mobile device 13 and the monitor-side device 14 can include an input unit, a display unit, a communication unit, a memory unit, a processing unit, and/or a positioning unit (not shown) for providing the functions such as data input, image displaying, communication connection, data storage, program storage, or positioning.

In more specific, before operating the driving service system 10, the provider-side mobile device 12, the passenger-side mobile device 13 or the monitor-side device 14 must be installed with an application (App). Moreover, the user must register this application and input a proper identity before logging in the system. In practice, the provider-side mobile device 12 is installed with a provider-side application, the passenger-side mobile device 13 is installed with a passenger-side application, and the monitor-side device 14 is installed with a monitor-side application. Of course, these three applications can be executed under the architecture of the driving service system 10. Besides, these three applications can be the same or different programs, and this disclosure is not limited.

In practice, the provider-side owner (driver) must install the provider-side application on the provider-side mobile device 12 and execute the provider-side application for communicational connecting the provider-side mobile device 12 and the server 11. Then, the provider-side owner (driver) has to input some information (e.g. name, age, identity, and address) and set up an account and a password through the input unit 121. After obtaining the authorization of the server 11, the provider-side owner (driver) can log in the server 11 with the set account and password. If the owner (student) of the passenger-side mobile device 13 or the owner of the monitor-side device 14 (school staff, parents, or bus company staff) wants to access this system, he/she must also register and obtain the authorization of the server 11 before logging in the system and utilizing the required function.

Accordingly, when being assigned with a driving mission, the driver (provider-side owner) can input the personal account and passwords through the input unit 121 of the provider-side mobile device 12. The inputted identity information can be transmitted to the server 11 for authorization (the server 11 will monitor the provider-side mobile device 12). Then, after obtaining the permission from the server 11, the driver can operate the input unit 121 to select or input a driving route corresponding to the driving mission. For example, if a driver A is temporarily assigned with a driving mission in the driving route B, the driver A can run the provider-side application and log in the system before driving the vehicle. After receiving the authorization from the server 11, the driver A can select or input the driving route B (a code) and the number of the selected school bus via the display unit 122. To be noted, the driving service system 10 of this embodiment is to track the vehicle instead of the driver. In more detailed, this system 10 does not track the GPS system of the vehicle, but tracks the provider-side mobile device 12 of the driver A, which is moving on the driving route B.

When the driver A drives the school bus on the driving route B, the provider-side mobile device 12 of the driver A can continuously send the position information to the server 11. In this embodiment, the provider-side mobile device 12 can send the position information to the server 11 periodically or based on the request of the server 11. For example, in the case that the network 20 is connected, the provider-side mobile device 12 can periodically send the position information (e.g. latitude and longitude), which corresponds to the current position of the school bus, to the server 11 every predetermined period. In other words, the position information outputted from the provider-side mobile device 12 varies as the time shifting, so that the position information sent to the server 11 can be renewed all the time. Accordingly, the server 11 can obtain the position of the provider-side mobile device 12 on the map information and the identity information of the provider-side owner (the driver A) according to the position information outputted from the provider-side mobile device 12 when the provider-side mobile device 12 is moving on the driving route B. For example, the map information can be the Google map (also named as the first map information M1).

Figure 3:
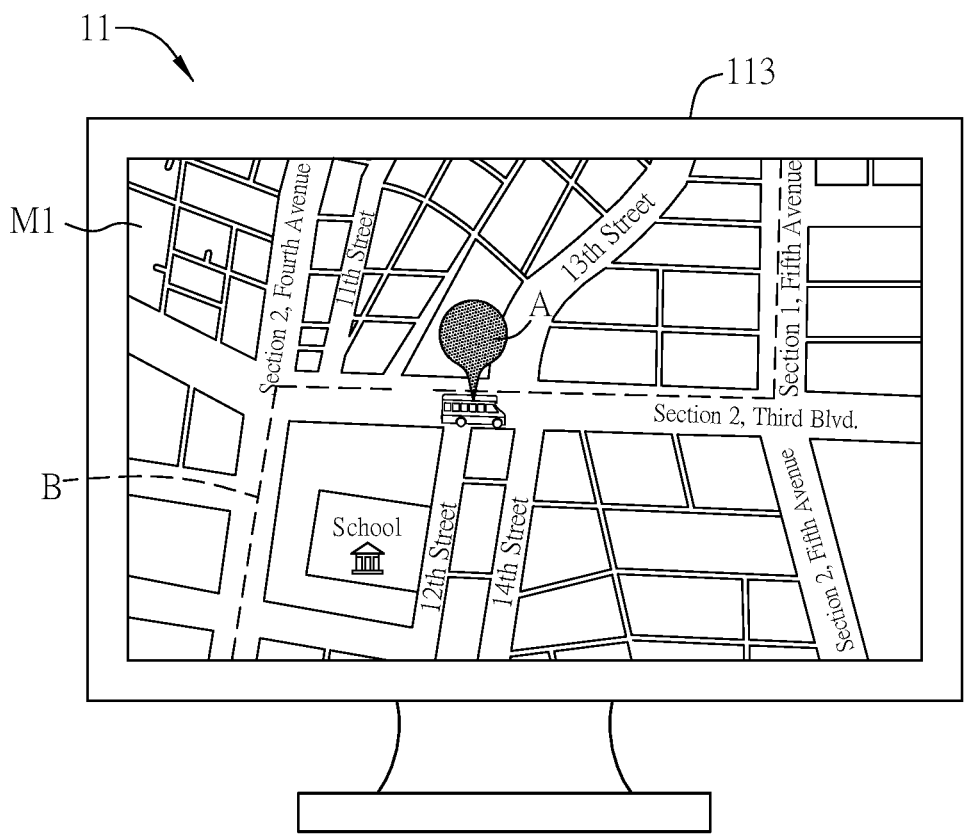
FIG. 3 is a schematic diagram showing the displayed content of a display unit of the server.

The first map information M1 can be pre-stored in the memory unit 112 of the server 11. FIG. 3 is a schematic diagram showing the displayed content of the display unit 113 of the server 11. As shown in FIG. 3, the first map information M1 as well as the position and identity information of the provider-side mobile device 12 (driver A) while moving on the driving route B can be together shown on the display unit 113 of the server 11. Accordingly, the system manager can realize the driving route B, the current position and the identity of the driver A, thereby assisting the management.

Figure 4:
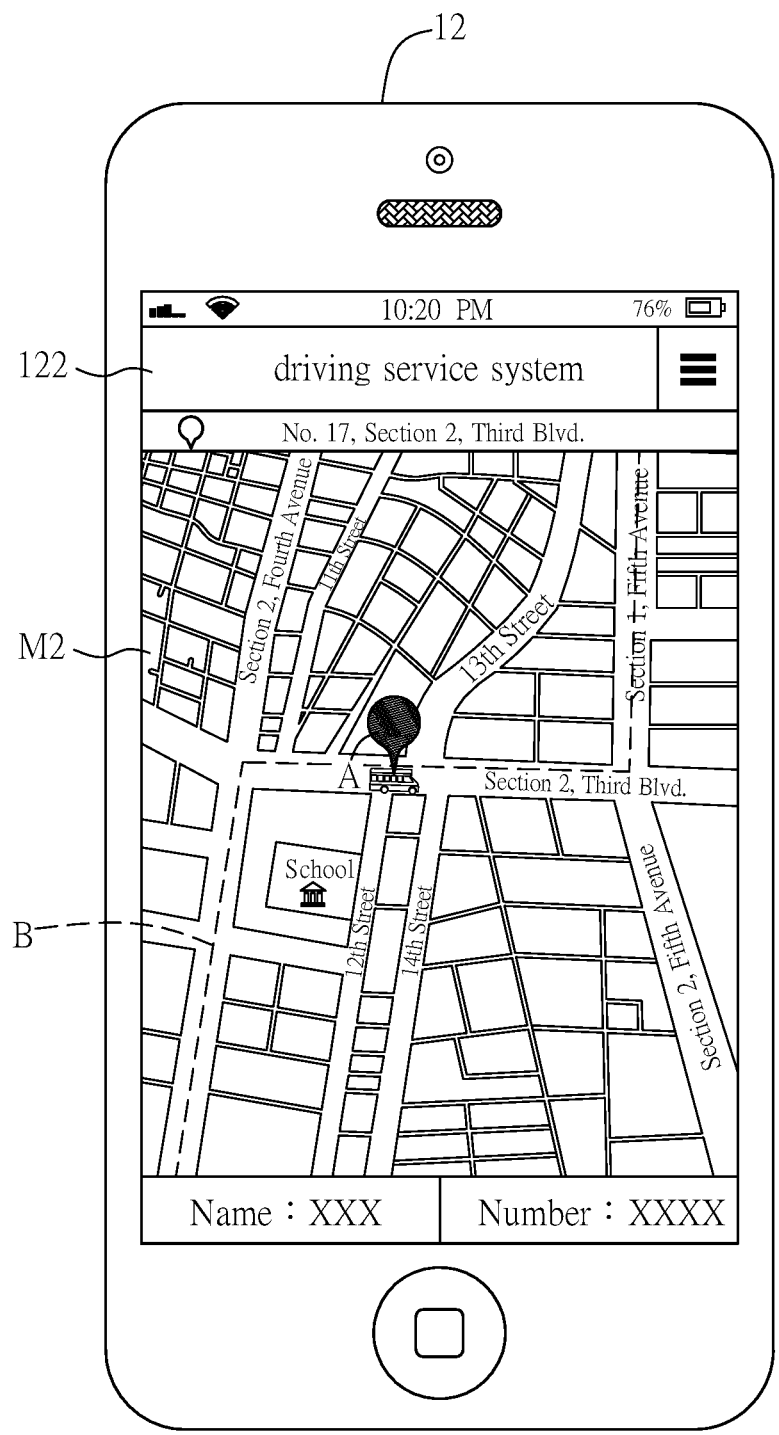
FIG. 4 is a schematic diagram showing the displayed content of a display unit of the provider-side mobile device.
Figure 5:
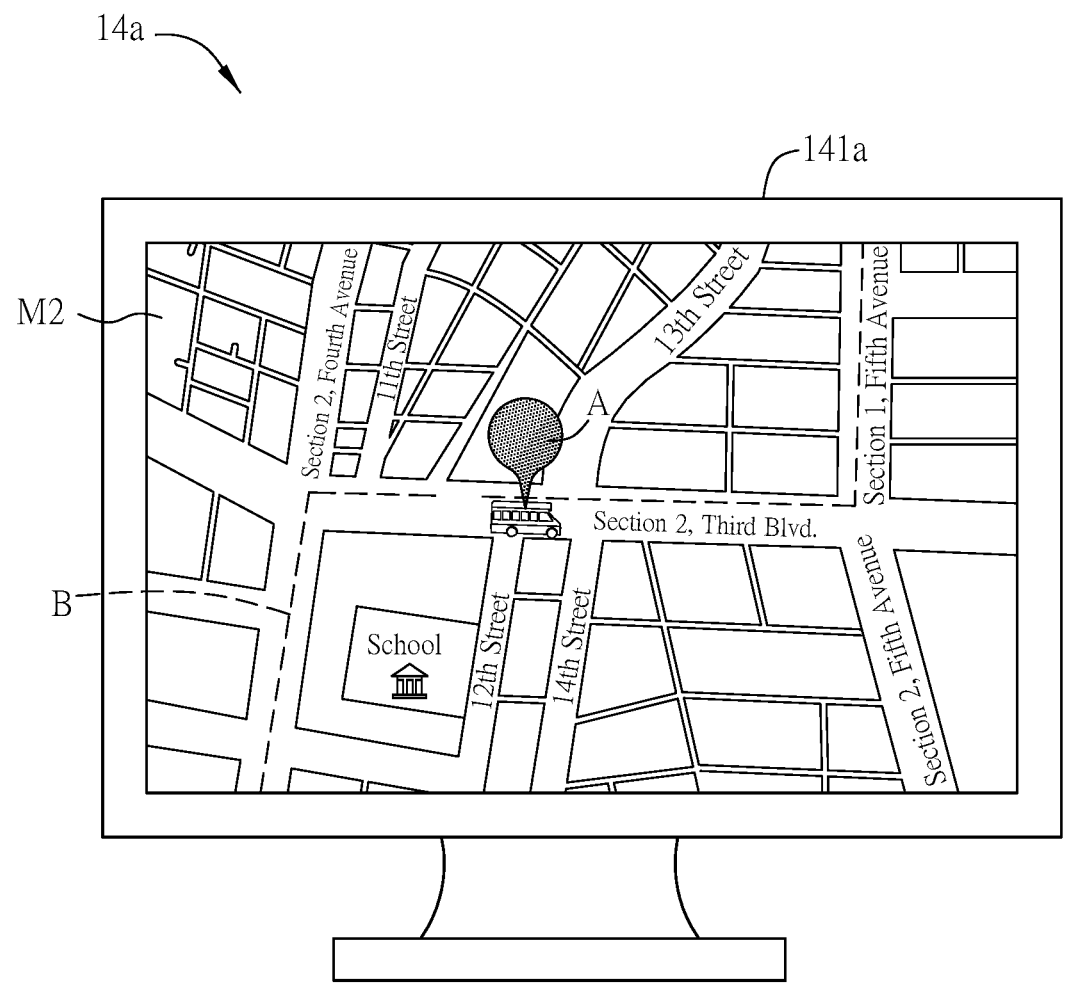
FIG. 5 is a schematic diagram showing the displayed content of a display unit of the monitor-side device.

In addition, the memory unit 124 of the provider-side mobile device 12 can also store another map information (e.g. the Google map and also named as second map information M2). FIG. 4 is a schematic diagram showing the displayed content of the display unit 122 of the provider-side mobile device 12. As shown in FIG. 4, the display unit 122 of the provider-side mobile device 12 can show the second map information M2 as well as the position of the provider-side mobile device 12 (driver A), the identity of the driver A, and the number of the school bus. FIG. 5 is a schematic diagram showing the displayed content of the display unit 141a of the monitor-side device 14. In this case, the monitor-side device 14 can be, for example, the monitor-side device 14a of school, which also includes a display device 141a. Thus, the display unit 141a of the monitor-side device 14a can show the current position of the provider-side mobile device 12 (the driver A) and the identity information of the driver A on the map information (M2) according to the position information and identity information of the provider-side mobile device 12 provided by the server 11. Accordingly, the owner of the monitor-side device 14 (school or parents) can be acknowledged about the number of the school bus, the current position, and the identity of the driver A, thereby assisting the management and monitoring of the school bus. Of course, the owner of the passenger-side mobile device 13 (student) can also view the display unit of the passenger-side mobile device 13 to realize some information such as the number of the school bus, the current position, and the identity of the driver A. Thus, the student may estimate how long the school bus will arrive the location of the student.

Figure 6:
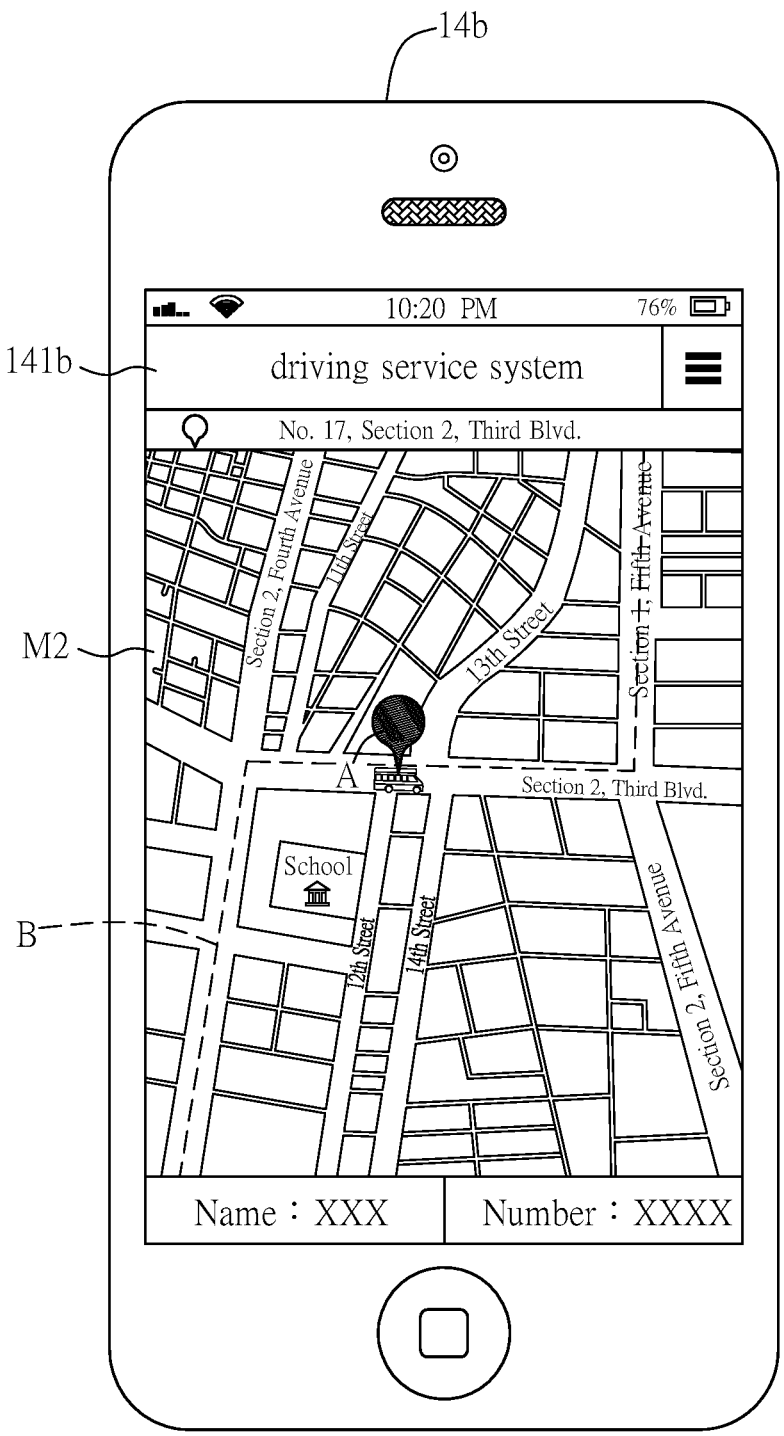
FIG. 6 is a schematic diagram showing another displayed content of a display unit of a monitor-side device.

FIG. 6 is a schematic diagram showing another displayed content of a display unit 141b of a monitor-side device 14b. The monitor-side device 14b (e.g. owned by the parents) can also catch the information about the number of the school bus, the current position, and the identity of the driver A. Thus, the parents can realize the situation as the child takes the school bus to school or go home.

Figure 7:
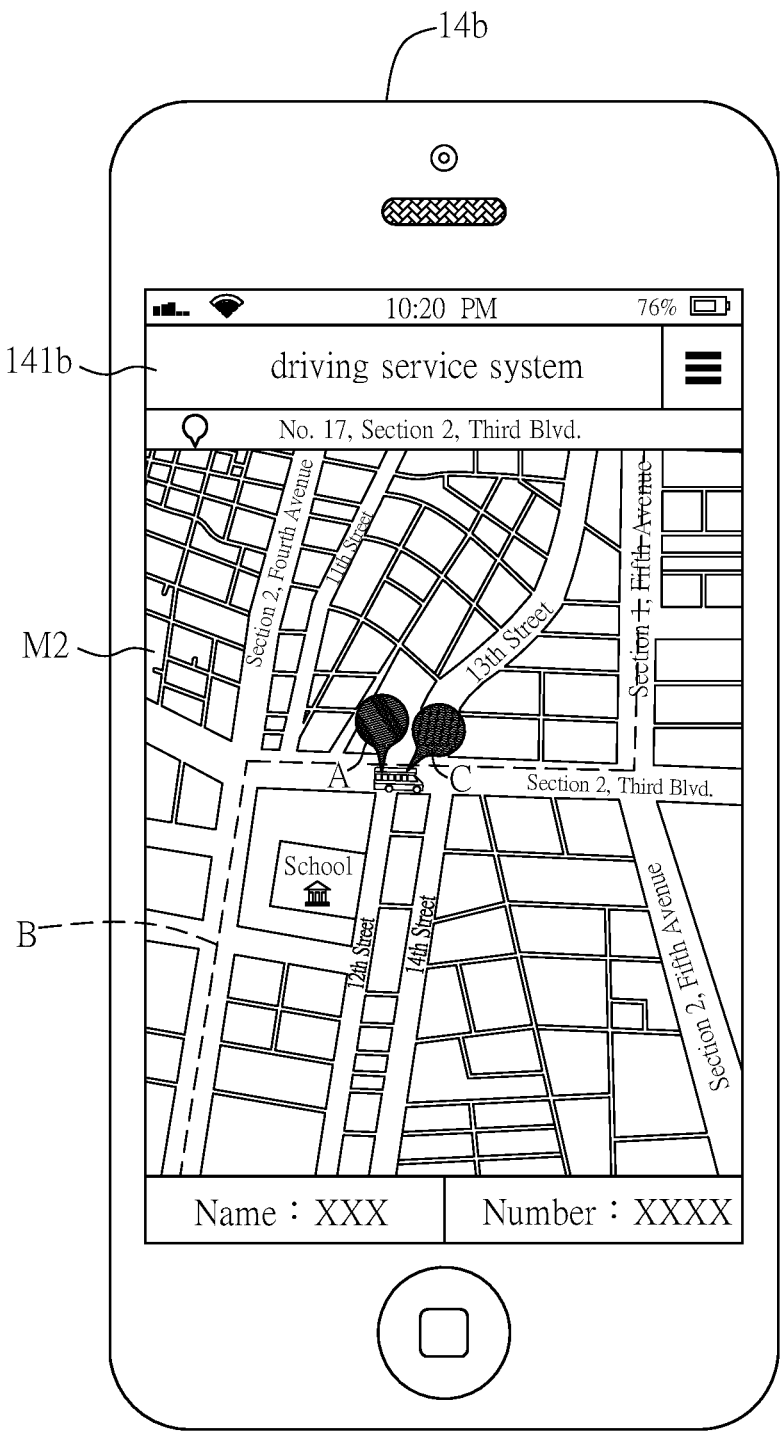
FIG. 7 is a schematic diagram showing another displayed content of a display unit of a monitor-side device.

Referring to FIG. 7, in some embodiments that the driver A has logged in the system through the provider-side mobile device 12 but has not selected or inputted the driving route corresponding to the driving mission, when a student C gets on the school bus with the personal passenger-side mobile device 13, the positioning unit (not shown) of the passenger-side mobile device 13 can receive the position signal, and the passenger-side mobile device 13 can calculate the positioning information (position information). Then, the positioning information (position information) can be transmitted to the server 11 through the communication unit (not shown) of the passenger-side mobile device 13. In this case, the server 11 can compare the positioning information (position information) of the passenger-side mobile device 13 (student C) with the driving route stored in the memory 112 so as to determine the driving route of the school bus that the student C is gotten on. As shown in FIG. 7, for example, it is determined that this school bus is moving on the driving route B. Accordingly, the system can automatically determine which driving route is selected by the driver A.

Accordingly, when the student C is on the school bus and the school bus is moving on the driving route B, the server 11 can retrieve the moving information of the passenger-side mobile device 13 (student C) and the provider-side mobile device 12 (driver A), which are together moving on the driving route B. At meanwhile, the server 11 can also send the identity information of the passenger-side owner (student C) of the passenger-side mobile device 13 to the monitor-side device 14. In more specific, after the student C gets on the school bus, the student C and the driver A will move together on the driving route B. Naturally, the passenger-side mobile device 13 (student C) and the provider-side mobile device 12 (driver A) will move on the driving route B together. When the server 11 receives the information indicating that the passenger-side mobile device 13 (student C) and the provider-side mobile device 12 (driver A) are moving together, it can be confirmed that the student has gotten on the school bus. Then, the server 11 can automatically send the identity information of the student C to the monitor-side device 14 (school or parents), so that the can be acknowledged that the student C has gotten on the school bus through the monitor-side device 14. Moreover, the school or parents can further realize the commuting situation of the student C between school and home, thereby achieving the goal of checking attendance.

If the student C does not have a passenger-side mobile device 13 (e.g. a cell phone), the position information of the student C cannot be sent to the server 11 in the above embodiment. In this case, the driver A can check the student C, who gets on the school bus. Actually, the driver A can operate the provider-side mobile device 12 to check the students anyway no matter the students have or do not have the passenger-side mobile devices 13. For example, the student C can show a personal identification card (e.g. NFC or RFID card), and the provider-side mobile device 12 can read the identification card for finishing the checking procedure. Thus, this system can realize that which school bus (driving route) is taken by the student C. In this case, the provider-side mobile device 12 can be configured with an NFC or RFID reader for reading the identification card of the student C. Alternatively, it is also possible to use the mobile device of another student for the checking procedure, and this disclosure is not limited. Accordingly, after the server 11 receives the identity information of the passenger (student C) transmitted from the provider-side mobile device 12 (or another mobile device), the server 11 can send the identity information of the passenger to the monitor-side device 14, so that the school or parents can be acknowledged that the student has gotten on the school bus. Of course, the monitor-side device 14 can inquire that whether a specific student has gotten on the school bus or not. In addition, when one student has not gotten on the school bus, the provider-side mobile device 12 can transmit the identity information of this student to the server 11. Then, the server 11 will send the identity information of the student to the monitor-side device 14 to notice the school or parents.

In addition, if the driver A logs in the system through the provider-side mobile device 12 but does not select or input the driving route corresponding to the driving mission, the server 11 can still automatically determine the current driving route, on which the driver A is currently driven (e.g. the driving route B), according to the positioning information (position information) of the provider-side mobile device 12 and the data of driving routes stored in the memory unit 112.

In some embodiments, if the provider-side mobile device 12 does not arrive a predetermined destination of the driving route B before a preset time, the provider-side mobile device 12 can send a delay event to the server 11, and the server 11 can send a delay notification to the monitor-side device 14 according to the delay event. For example, when the vehicle breaks down on the halfway and fails to reach the designated destination of driving route B in the originally scheduled time (for example, the student cannot be delivered to the school on time before 7:20), the driver A can operate the input unit 121 of the provider-side mobile device 12 for inputting and transmitting a "vehicle failure delay event" to the server 11, and the server 11 can notify the monitor-side device 14. Accordingly, the school or parents can grasp the instant driving situation of the school bus to make the appropriate response.

In some embodiments, if an event occurs when the provider-side mobile device 12 is moving on the driving route B, the provider-side mobile device 12 may send a report event to the server 11, and the server 11 can send a report notification to the monitor-side device 14 according to the report event. For example, if a school bus has an accident on the driving route B, the driver A can operate the input unit 121 of the provider-side mobile device 12 for inputting and transmitting a "car accident notification" to the server 11, and the server 11 can notify the monitor-side device 14. Accordingly, the school or parents can grasp the immediate driving situation of the school bus to make the appropriate response. In this embodiment, the notification of the delay event or the report notification can be transmitted to the monitor-side device 14 by, for example but not limited to, broadcasting, texting, or voice mail.

As mentioned above, the concept of the driving service system 10 of this embodiment is to track the person (driver) instead of tracking the vehicle (school bus). Thus, the school or bus company can dynamically assign the driver and the driving route, and instantly know the driver for driving on a certain driving route and the driving situation, thereby improving the flexibility on dispatch.

In some embodiments, the manager and maintenance staff of the server 11, the owner (student) of the passenger-side mobile device 13, and/or the owner (school or parents) of the monitor-side device 14 can instantly know the position and situation of the driver or student, thereby increasing the convenience in management.

To sum up, in the driving service system of this disclosure, when a driving mission is assigned to a provider-side owner of the provider-side mobile device, the provider-side owner operates the input unit of the provider-side mobile device to input identity information of the provider-side owner and to select a driving route corresponding to the driving mission, the provider-side mobile device provides position information when moving on the driving route, and the server obtains a position of the provider-side mobile device on first map information and the identity information of the provider-side owner according to the position information. Accordingly, the driving service system of this disclosure is to track the user instead of tracking the vehicle. Thus, the system can dynamically assign the provider (driver) and the driving route, and instantly know the driver for driving on a certain driving route and the driving situation, thereby improving the flexibility on dispatch.

In some embodiments, the manager and maintenance staff of the server, the owner of the passenger-side mobile device, and the owner of the monitor-side device can instantly know the position and situation of the provider or passenger, thereby increasing the convenience in management.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A driving service system, comprising:
    a server; and
    a provider-side mobile device communicationally connected with the server and comprising an input unit;
    wherein, when a driving mission is assigned to a provider-side owner of the provider-side mobile device, the provider-side owner operates the input unit of the provider-side mobile device to input identity information of the provider-side owner and to select a driving route corresponding to the driving mission, the provider-side mobile device provides position information when moving on the driving route, and the server obtains a position of the provider-side mobile device on first map information and the identity information of the provider-side owner according to the position information;
    wherein when the driving route corresponding to the driving mission is not selected by or inputted into the provider-side mobile device, the server obtains the driving route by comparing the position information of the provider-side mobile device and the driving routes stored in a memory unit of the server.

2. The driving service system according to claim 1, further comprising:
    a passenger-side mobile device or a monitor-side device communicationally connected with the server, wherein the provider-side mobile device, the passenger-side mobile device, or the monitor-side device comprises a display unit, and the display unit of the provider-side mobile device, the passenger-side mobile device, or the monitor-side device shows the position of the provider-side mobile device on second map information and the identity information of the provider-side owner according to the position information.

3. The driving service system according to claim 1, further comprising:
    a passenger-side mobile device and a monitor-side device communicationally connected with the server, wherein when the server receives information indicating that the passenger-side mobile device and the provider-side mobile device are moving together on the driving route, the server sends information of a passenger-side owner of the passenger-side mobile device to the monitor-side device.

4. The driving service system according to claim 1, further comprising:
    a monitor-side device communicationally connected with the server, wherein when the server receives passenger identity information from the provider-side mobile device, the server sends the passenger identity information to the monitor-side device.

5. The driving service system according to claim 1, further comprising:
    a monitor-side device communicationally connected with the server, wherein when the provider-side mobile device does not arrive at a designated destination within a predetermined time, the provider-side mobile device sends a delay event to the server, and the server sends a delay notification to the monitor-side device according to the delay event.

6. The driving service system according to claim 1, further comprising:
    a monitor-side device communicationally connected with the server, wherein when an event is happened as the provider-side mobile device is moving on the driving route, the provider-side mobile device sends a report event to the server, and the server sends a report notification to the monitor-side device according to the report event.

7. A provider-side mobile device of a driving service system, wherein the driving service system comprises a server communicationally connected with the provider-side mobile device, the provider-side mobile device comprising:
    an input unit;

wherein, when a driving mission is assigned to a provider-side owner of the provider-side mobile device, the provider-side owner operates the input unit of the provider-side mobile device to input identity information of the provider-side owner and to select a driving route corresponding to the driving mission, the provider-side mobile device provides position information when moving on the driving route, and the server obtains a position of the provider-side mobile device on first map information and the identity information of the provider-side owner according to the position information;

wherein when the driving route corresponding to the driving mission is not selected by or inputted into the provider-side mobile device, the server obtains the driving route by comparing the position information of the provider-side mobile device and the driving routes stored in a memory unit of the server.

8. The provider-side mobile device according to claim 7, wherein the driving service system further comprises a passenger-side mobile device or a monitor-side device communicationally connected with the server, the provider-side mobile device, the passenger-side mobile device, or the monitor-side device comprises a display unit, and the display unit of the provider-side mobile device, the passenger-side mobile device, or the monitor-side device shows the position of the provider-side mobile device on second map information and the identity information of the provider-side owner according to the position information.

9. The provider-side mobile device according to claim 8, wherein the driving service system further comprises a passenger-side mobile device and a monitor-side device communicationally connected with the server, and when the server receives information indicating that the passenger-side mobile device and the provider-side mobile device are moving together on the driving route, the server sends information of a passenger-side owner of the passenger-side mobile device to the monitor-side device.

10. The provider-side mobile device according to claim 7, wherein the driving service system further comprises a monitor-side device communicationally connected with the server, and when the server receives passenger identity information from the provider-side mobile device, the server sends the passenger identity information to the monitor-side device.

11. The provider-side mobile device according to claim 7, wherein the driving service system further comprises a monitor-side device communicationally connected with the server, and when the provider-side mobile device does not arrive at a designated destination within a predetermined time, the provider-side mobile device sends a delay event to the server, and the server sends a delay notification to the monitor-side device according to the delay event.

12. The provider-side mobile device according to claim 7, wherein the driving service system further comprises a monitor-side device communicationally connected with the server, and when an event is happened as the provider-side mobile device is moving on the driving route, the provider-side mobile device sends a report event to the server, and the server sends a report notification to the monitor-side device according to the report event.

13. A server of a driving service system, wherein the driving service system comprises a provider-side mobile device communicationally connected with the server and comprising an input unit;

wherein, when a driving mission is assigned to a provider-side owner of the provider-side mobile device, the provider-side owner operates the input unit of the provider-side mobile device to input identity information of the provider-side owner and to select a driving route corresponding to the driving mission, the provider-side mobile device provides position information when moving on the driving route, and the server obtains a position of the provider-side mobile device on first map information and the identity information of the provider-side owner according to the position information;

wherein when the driving route corresponding to the driving mission is not selected by or inputted into the provider-side mobile device, the server obtains the driving route by comparing the position information of the provider-side mobile device and the driving routes stored in a memory unit of the server.

14. The server according to claim 13, wherein the driving service system further comprises a passenger-side mobile device or a monitor-side device communicationally connected with the server, the provider-side mobile device, the passenger-side mobile device, or the monitor-side device comprises a display unit, and the display unit of the provider-side mobile device, the passenger-side mobile device, or the monitor-side device shows the position of the provider-side mobile device on second map information and the identity information of the provider-side owner according to the position information.

15. The server according to claim 13, wherein the driving service system further comprises a passenger-side mobile device and a monitor-side device communicationally connected with the server, and when the server receives information indicating that the passenger-side mobile device and the provider-side mobile device are moving together on the driving route, the server sends information of a passenger-side owner of the passenger-side mobile device to the monitor-side device.

16. The server according to claim 13, wherein the driving service system further comprises a monitor-side device communicationally connected with the server, and when the server receives passenger identity information from the provider-side mobile device, the server sends the passenger identity information to the monitor-side device.

17. The server according to claim 13, wherein the driving service system further comprises a monitor-side device communicationally connected with the server, and when the provider-side mobile device does not arrive at a designated destination within a predetermined time, the provider-side mobile device sends a delay event to the server, and the server sends a delay notification to the monitor-side device according to the delay event.

18. The server according to claim 13, wherein the driving service system further comprises a monitor-side device communicationally connected with the server, and when an event is happened as the provider-side mobile device is moving on the driving route, the provider-side mobile device sends a report event to the server, and the server sends a report notification to the monitor-side device according to the report event.

* * * * *